United States Patent [19]
Davison

[11] Patent Number: 5,240,052
[45] Date of Patent: Aug. 31, 1993

[54] PRECISION ROUTER GUIDE METHOD AND APPARATUS

[76] Inventor: Daniel M. Davison, 2017 E. Santa Fe, Fullerton, Calif. 92631

[21] Appl. No.: 961,152

[22] Filed: Oct. 15, 1992

[51] Int. Cl.⁵ ............................................. B27M 3/00
[52] U.S. Cl. ...................................... 144/372; 33/197; 33/562; 144/137; 144/144 R; 144/144.5 R; 409/130
[58] Field of Search ............... 409/125, 130, 181, 182; 144/134 D, 136.7, 137, 144 R, 144.5, 371, 372

[56] References Cited

U.S. PATENT DOCUMENTS

| | | | |
|---|---|---|---|
| 3,450,001 | 6/1969 | Fortune | 144/144.5 R |
| 3,967,665 | 7/1976 | Lund | 144/371 |
| 4,630,657 | 12/1986 | Obradovich | 144/372 |
| 4,742,853 | 5/1988 | Davison | 144/144.5 R |
| 4,966,507 | 10/1990 | Hanks | 144/144.5 R |
| 5,052,454 | 10/1991 | Meinhardt | 144/144.5 R |

*Primary Examiner*—W. Donald Bray

[57] ABSTRACT

A precision router guide for guiding a router in the formation of grooves, slots, steps or other cutaway sections of various widths in a work piece. The precision router guide includes a rectilinear guide member with an integral clamping assembly for securing the guide member to a work piece, and an adjustable template assembly adapted to be slidingly coupled to the guide member. The adjustable template assembly is configured to receive a router base, and has provision for the router bit to extend through an opening into engagement with the work piece. The adjustable template assembly also includes two adjustable guide elements and one fixed and one adjustable stop designed to allow adjustable movement between the router base and the template assembly in a direction perpendicular to the guide member, the amount of such movement being determined by the desired width of the cut. Adjustable pointers are provided on the template assembly to enable the groove, slot, step or other cutaway section to be precisely located on the work piece.

16 Claims, 2 Drawing Sheets

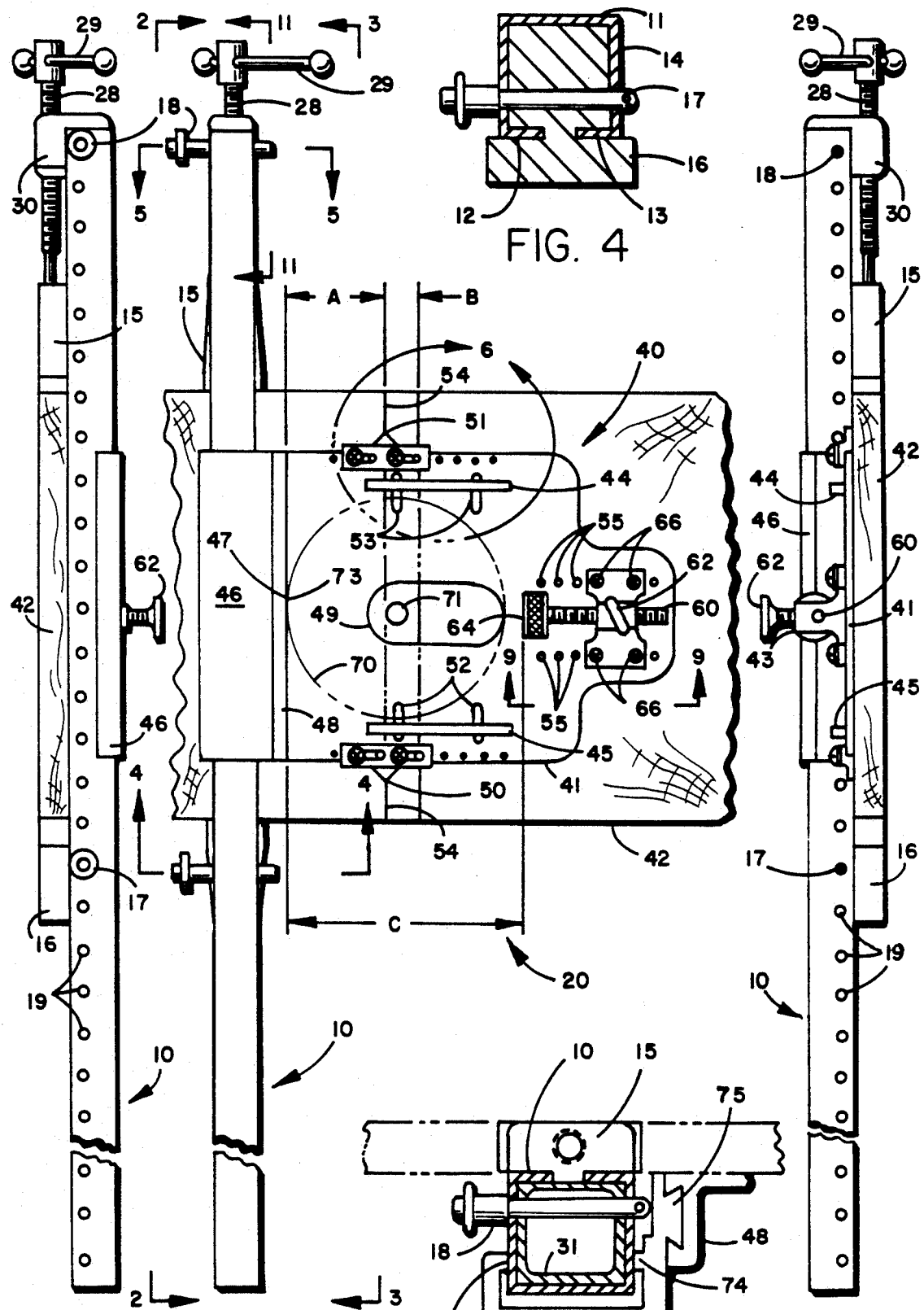

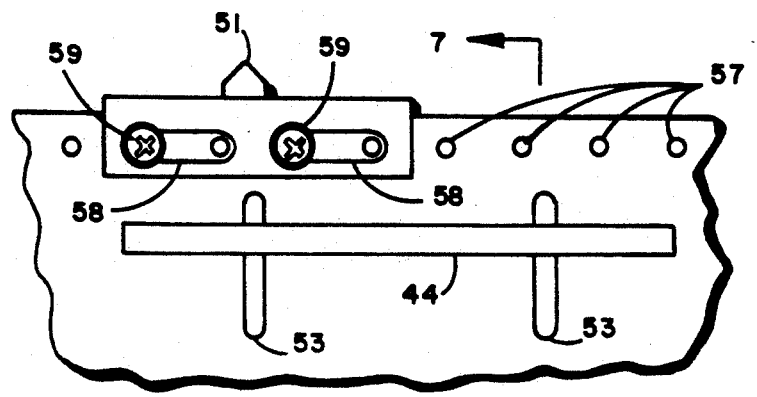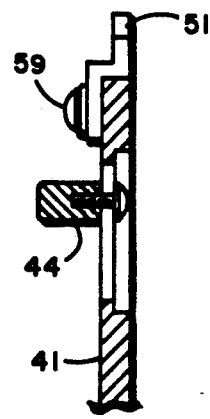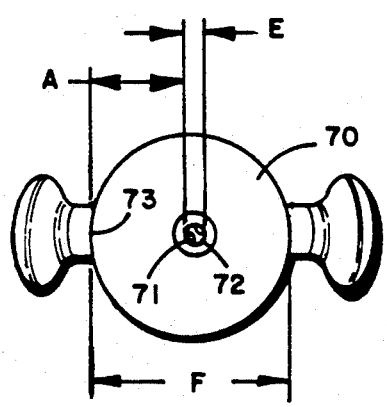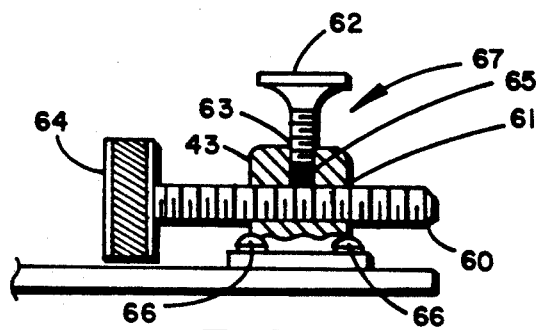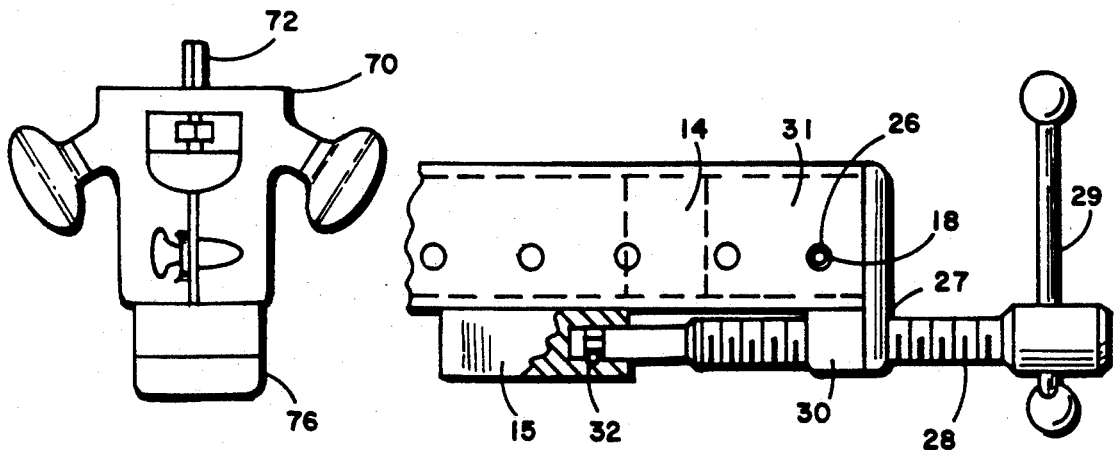

PRECISION ROUTER GUIDE METHOD AND APPARATUS

BACKGROUND OF THE INVENTION

1. Field of the Invention

The present invention relates to a precision router guide, and more particularly, to a novel and improved method and apparatus for accurately guiding a router in the formation of grooves, slots, steps or other cutaway sections of various widths, such as in the construction of wooden shelving for edge-wise joining of the shelves thereto and therein.

2. Description of the Prior Art

Carpentry work frequently requires the precise formation of the tongue and groove or dado joint which provides a strong joining means for perpendicular configurations. The rabbet joint used for corner applications may be considered as a one sided dado joint and is formed in a similar manner. Both of these joints are commonly formed with the dado head cutter in conjunction with a table saw or radial arm saw. While this means is acceptable for high production precision applications, it lacks the portability, flexibility, safety and economy that is required by many carpenters. The introduction of the high speed router has made it possible to form dado and rabbet joints without these restrictions provided that a convenient guiding means could be developed.

Prior art devices that may be used to cut the rabbet and dado joints may be divided into two categories. The first category is composed of the decorative routing templates as illustrated in U.S. Pat. Nos. 4,062,123 and 3,875,670. These templates are comprised of a set of elongate bar members that are slidingly interconnected to form a rigid open frame configuration having a flat coplaner bottom that when attached to a work piece, may be used for guiding the routing tool thereover. Although these templates may be used for cutting dado and rabbet joints, they require excessive set up time and provide little advantage over a pair of individual straight edges. The second category of prior art devices is composed of those router guides that are specifically designed for cutting dado and rabbet joints as represented in U.S. Pat. Nos. 3,967,665 and 4,742,853. These router guides are composed of parallel guide members that may be movably adjusted by means of gauges whereby when correctly positioned and attached to the work piece, the router may be operably disposed between them so that the router is precisely positioned to cut the slot desired in the work piece. Because these devices provide guiding edges that are parallel and easily adjustable, they represent a significant improvement in the state of the art.

The second category of prior art devices are the most useful for cutting dado and rabbet joints, however these devices are expensive to manufacture due to the large number of special precision parts, and they tend to be heavy, and awkward to use. They also require complicated gauging procedures when locating the template on the work piece and setting the guide member spacing. Moreover, these devices utilize clamps which require access to the underside of the work piece, an arrangement that is inconvenient and undersirable. Because of these limitations in the prior art, router guides for cutting dado and rabbet joints are not widely used, and in fact, are generally unavailable. This situation will only be rectified if the state of the art is advanced to such an extent that these limitations are overcome.

SUMMARY OF THE INVENTION AND OBJECTS

The foregoing and other objects of the invention are accomplished by providing a precision router guide which is specifically adaptable for use in conjunction with a high speed router for routing out grooves, slots, steps or other cutaway sections of various lengths, widths and depths in a work piece. This precision router guide is composed of a rectilinear guide member with an integral clamp for attachment to a work piece, and an adjustable template assembly configured to receive a router thereon and adapted to be removably coupled to said guide member thereby enabling sliding movement of said router and template assembly along said guide member in a first direction for cutting a groove, slot, step or cutaway section of the desired length in the work piece, said template assembly including an enlarged opening therein enabling the router bit to extend therethrough into engagement with said work piece to the desired depth, adjustable guide means thereon for guiding the routers motion in a second direction transverse to said first direction whereby the movement of the router in said second direction may be limited to a predetermined distance enabling the router bit to cut from the work piece a groove, slot, step or cutaway section of the desired width, and adjustable alignment means along and about said second direction whereby the coupled guide member and template assembly may be precisely positioning on the work piece thereby enabling the router to cut a groove, slot, step or other cutaway section in the desired location.

In accordance with an aspect of the invention, it is an object of the invention described herein to reduce the number of special precision parts as compared to the present state of the art and thereby reduce the cost.

A further object of the invention is to reduce the size and weight of the apparatus, making it easier to transport, store and use.

A yet further object of the invention is to reduce the operational complexity so that its application is easily understood.

A yet still further and important object of the invention is to implement a horizontal clamping system that will not require access to the underside of the work piece.

BRIEF DESCRIPTION OF THE DRAWINGS

FIG. 1 is a plan view of the precision router guide.

FIG. 2 is a left side elevational view of the present invention taken along Plane 2—2 of FIG. 1.

FIG. 3 is a right side elevational view of the present invention taken along Plane 3—3 of FIG. 1.

FIG. 4 is a view of the present invention taken along Plane 4—4 of FIG. 1.

FIG. 5 is a view of the present invention taken along Plane 5—5 of FIG. 1.

FIG. 6 is an enlarged view of region 6 of the present invention of FIG. 1.

FIG. 7 is a view of a portion of the present invention taken along Plane 7—7 of FIG. 6.

FIG. 8 is a bottom view of a router showing the router base and router bit.

FIG. 9 is a view of a portion of the present invention taken along Plane 9—9 of FIG. 1.

FIG. 10 is a side view of a router showing the router base and router bit.

FIG. 11 is a view of a portion of the present invention taken along Plane 11—11 of FIG. 1.

DESCRIPTION OF THE PREFERRED EMBODIMENT OF THE INVENTION

With continued reference now to all of the drawings herein, there is indicated in FIG. 1 the present invention which is referred to as a precision router guide, generally designated 20, composed of a self clamping rectilinear guide member generally designated 10, and an adjustable template assembly generally designated 40.

The self clamping rectilinear guide member 10, subsequently referred to as a "guide member", is in the form of an elongate unitary extruded member having a cross section as shown in FIG. 4 and comprising a channel shaped section 11, with two elongate flanges 12, 13 form a flat planer bottom. The channel shaped section 11 and the two elongate flanges 12, 13 forming in combination an elongate rectangular cavity 14 that is closed on three sides and partially open on the bottom defining a centered slot. The elongate cavity so formed will constrain the screw adjustable clamp block 15, and the incrementally adjustable reference block 16, to rectilinear motion in a first direction along the guide member 10. Moreover, for fixing the reference block 16 at specific locations along the guide member 10, and for attaching the rectangular projection 31 to the guide member 10 as shown in FIGS. 5 and 11, the channel shaped section 11 contains a plurality of equally spaced laterally extending apertures 19 sized to receive quick release pins 17 and 18 as shown in FIGS. 2, 4 and 5.

The guide member self clamping mechanism shown in FIG. 11 comprises a clamp body 30 having one threaded aperture 27, one unthreaded aperture 26 and a rectangular projection 31 that fits into the elongate rectangular cavity 14 and is held in place by quick release pin 18 as shown in FIGS. 5 and 11. A clamp screw 28 with sliding handle 29 fits into the threaded aperture 27 and engages the clamp block 15. The clamp screw 28 is prevented from disengaging from the clamp block 15 by means of a retaining pin 32. In application, the guide member 10 defining a first direction is positioned across a work piece 42 with the clamp block 15 against the work piece 42. The reference block 16 is now relocated as closely as possible to the work piece 42 and fixed in place with quick release pin 17. The clamp screw 28 is now turned clockwise until the work piece 42 is securely clamped between the clamp block 15 and reference block 16.

The adjustable template assembly 40 referred to subsequently as the "template assembly" is composed of a support plate 41, a guide member coupling element 46, a stationary stop element 47, an adjustable stop assembly 67, two adjustable guide elements 44, 45, and two laterally adjustable pointers 50, 51 as shown in FIG. 1, 6 and 9. The support plate 41 is a generally flat member having an enlarged opening 49 extending in a second direction which when in operation is transverse to said first direction and an upwardly extending portion 48 connected to a guide member coupling element 46 as shown in FIG. 5. The guide member coupling element 46 is connected to the upward extending portion of the support plate 48 by means of a tight sliding dovetail joint 75, and is in the form of an elongate extruded member having a cross section as shown in FIG. 5. The coupling element 46 is composed of a material that is slidingly compatible with the guide member 10, and comprises a channel shaped section with two apposing contact projections 73, 74 spaced to provide secure sliding engagement for precise sliding movement of the template assembly 40 in said first direction when said template assembly 40 is coupled to said guide member 10. The stationary stop element 47 is formed by the central region of the upwardly extending portion of the support plate 48. The adjustable stop assembly 67 comprises a stop support element 43 having a first threaded aperture 61 extending horizontally through its width wherein the spindle 60 is received, and a second threaded aperture 63 extending vertically and intersecting the first threaded aperture 61 midway wherein the locking screw 62 is received and whereby the spindle 60 and the attached stop element 64 are locked by means of the plastic friction element 65 as shown in FIG. 9. The adjustable stop assembly 67 is attached to the support plate 41 by means of a plurality of aligned apertures 55 equally spaced about and along the second direction axis wherein four threaded fasteners 66 are installed as shown in FIG. 1. The adjustable guide elements 44, 45 are rectangular sections that project upwards from the support plate 41 and are attached adjustably to the support plate by means of slotted apertures 52, 53 the under sides of which are recessed to allow a flush fastening means as shown in FIG. 7. The pointers 50, 51 are adjustably mounted by means of slotted apertures 58 to the support plate 41 using threaded fasteners 59 and a plurality of aligned pairs of threaded apertures 57 equally spaced about and along the second direction axis as shown in FIG. 1 and 6.

The template assembly 40 is configured to receive a router 76 on said support plate 41 with the router bit 72 extending through the enlarged opening 49 and includes limiting means whereby the routers movement may be limited relative thereto, said means including two adjustable guide elements 44, 45 for restricting the motion of the router base 70 in said first direction, and one stationary stop element 47 and one adjustable stop element 64 for limiting the motion of the router base 70 in said second direction whereby when the template assembly 40 is slidingly coupled to the guide member 10, and the router positioned on the template assembly 40, with the router bit 72 extending through the enlarged opening 49 to the desired depth, the router 76 will have freedom of motion along either or both of said first and second directions for cutting a groove, slot, step or other cutaway section of the desired length, width and depth in the work piece 42.

OPERATION AND APPLICATION OF THE INVENTION

In operation the precision router guide 20 is simple in design and easy to use. It greatly enhances the usefulness of the portable router 76 by providing a means for easily and precisely controlling the position, width and depth of the router cut for dado and rabbet joint applications. The following explanation provides step by step instructions on how to use the precision router guide 20 to cut these common joints.

All applications of the portable router 76 require that the cutting tool 72 be guided by some means during the cutting process. For cutting precision slots or notches that are wider than the router bit, guidance is required along two orthogonal directions. The required two dimensional guidance is provided by means of the guide member 10 for moving the router 76 along the length of the cut, and the adjustable stop element 64 located on the template assembly 40 for controlling the motion of the router bit 72 perpendicular to the guide member 10. By setting the spacing between the adjustable guide elements 44, 45 to slightly larger than the diameter of the router base "F" as shown in FIG. 8, and by adjusting the spacing "C" between the stationary stop element 47 and the adjustable stop element 64 to the diameter of the router base "F" plus the width of the desired cut "B" minus the diameter of the router bit "E" as shown in FIGS. 1 and 8, any width of cut may be achieved within the constraints of the template dimensions. Pointers 50 and 51 are used for locating the precision router guide 20 on the work piece 42 relative to the desired cut location 54 as shown in FIG. 1, and may be adjusted over a wide range to accommodate different sized router bases 70. The procedure for setting pointers 50 and 51 are explained hereinafter.

The guide member 10 is clamped to the work piece 42 by means of the integral clamping mechanism shown in FIGS. 2 and 11. This integral clamp includes a screw adjustable clamp block 15, and an incrementally adjustable reference block 16 held in place by quick release pin 17 as shown in FIG. 2. The reference block 16, may be positioned at one inch intervals along the guide member 10 and is relocated when major adjustments in the spacing between the clamp block 15 and the reference block 16 are required. The clamp block 15 is attached to a threaded screw 28 and is used to provide the clamping force as well as to provide minor adjustments in the spacing between clamp block 15 and reference block 16.

The adjustable stop assembly 67 of FIG. 7 comprises a stop support 43, a stop lock 62, and an adjustable stop element 64. The stop support 43 may be fastened to the support plate 41 over a range of locations as shown in FIG. 1. Once located however, the adjustable stop element 64, is adjusted by unlocking the stop lock 62 and then turning the adjustable stop element 64 either clockwise or counter clockwise depending on the motion desired. The spindle 60 is designed to provide one sixteenth of an inch adjustment per revolution.

PROCEDURE FOR SETTING THE POINTERS AND STOPS

For setting the router guide pointers and stops, by reference to FIGS. 1 and 6, the pointers 50, 51 are for locating the coupled guide member 10 and adjustable template assembly 40 with respect to a desired cut location 54 on the work piece 42. Correctly set pointers 50, 51 will be positioned as shown in FIG. 1, with pointers 50 and 51 located a distance "A" from the stationary stop element 47 and lined up with the inside boundary of the router cut 54. The distance "A" in FIG. 1 represents the distance between some arbitrary point 73 on the router base plate 70 and the router bit cutting circle 71 as shown in FIG. 8. This dimension, subsequently referred to as the "offset" will vary depending on the router base diameter "F" and router bit diameter "E" being used.

The pointers 50, 51 may be positioned by either of two procedures. The first and most accurate procedure is to locate the guide member 10 and template assembly 40 on a piece of scrap material 42 as shown in FIG. 1 and then make a trial cut while holding an arbitrary point 73 of the router base against the stationary stop element 47. The pointers 50, 51 are then adjusted to line up exactly with the edge of the cut 54 as shown in FIG. 1. Once an arbitrary point on the router base 73 is chosen for a particular router and router bit combination, the offset "A" as shown in FIG. 1 is defined. All subsequent cuts should be made with the router base point 73 adjacent to the stationary stop element 47 unless the router base plate 70 is concentric with the router bit cutting circle 71. In this special case, the circumference of the router base plate 70 is everywhere equal to the offset "A" from the router bit cutting circle 71 and no particular orientation is preferred. The second procedure is to measure the offset "A" directly from the router base 70 as shown in FIG. 8 and then locate the pointers 50, 51 a distance equal to the offset "A" from the stationary stop element 47 as shown in FIG. 1. This procedure does not account for the small clearance between the guide member 10 and the guide member coupling element 46, however for most applications this error will be negligible.

The adjustable guide elements 44, 45 are separated by a distance equal to the diameter of the router base "F" as shown in FIG. 8 plus a small clearance to enable the placement of the router base therebetween as shown in FIG. 1. The adjustable end stop element 64 is separated from the stationary stop element 47 by a distance "C" equal to the diameter of the router base "F" plus the width of the cut "B" minus the diameter of the router bit "E" as shown in FIGS. 1 and 8.

PROCEDURE FOR CUTTING A DADO JOINT

For cutting a dado joint, the following procedure requires that the pointers 50, 51 and adjustable guide elements 44, 45 shown in FIG. 1 be correctly set using the method outlined in the previous section. Once this is accomplished, the position of the dado cut is marked with a reference line 54 on the side of the cut that will be closest to the guide member 10. The Guide member is then positioned across the work piece 42 by making adjustments in the adjustable clamp block 16 and reference clamp block 15 as required. The template assembly 40 is now coupled to the guide member 10 and the entire assembly is adjusted until the pointers 50, 51 correspond with the line 54. The guide member is now clamped to the work piece 42 and the position checked by sliding the template assembly 40 along the guide member 10. If the pointers 50, 51 do not point to the line 54, loosen the clamp screw 28 and adjust as necessary. Once the guide member and template assembly are correctly positioned, the spacing "C" between the stationary stop element 47 and the adjustable stop element 64 is set to the desired width, and the router bit 72, is adjusted to protrude beyond the router base 70 by a distance equal to the desired depth of cut plus the thickness of the support plate 41. The template assembly 40 is then moved to the edge of the work piece 42 and the router positioned on the support plate 41 with the router bit free of interference and the selected point on the router base 73 adjacent to the stationary stop element 47. The router 76 is now turned on and a cut is made by sliding the template assembly across the work piece firstly with the router 70 against the adjustable stop 64, and then moving in the opposite direction, with the router base against the fixed stop 47. If extreme accuracy is desired, the cut may be made undersize initially and then adjusted by opening the adjustable stop element 64 incrementally until the desired cut width is achieved.

The procedure for cutting a rabbet joint is very similar to cutting a dado joint accept that the setting of the adjustable stop element 64 is not critical and may be set wider than the width of the cut desired.

It will be understood that the above description gives an illustrative embodiment of the present invention, and that the invention is not limited to the specific forms shown. It should be clearly understood that certain obvious modifications will readily occur in the design and arrangement of the elements to those skilled in the art to which the instant invention pertains without departing from the spirit of the invention as expressed in the appended claims.

What is claimed is:

1. A precision router guide apparatus adapted to guide a high speed router for cutting grooves, slots, steps and other cutaway sections of variable width from a work piece, said router including a router base and a router bit, said apparatus comprising:

a guide member adapted to be removably attached to the work piece, an adjustable template assembly adapted to be removably coupled to said guide member thereby enabling sliding motion of said template assembly along said guide member in a first direction over said work piece, said template assembly including a support plate adapted for receiving the router base thereon and having an enlarged opening therein enabling the router bit to extend therethrough into engagement with the work piece, said support plate having a guide member coupling element along one edge configured for secure sliding engagement with said guide member, in said first direction, and adjustable guide means on said support plate adapted for guiding the movement of the router in a second direction transverse to said first direction whereby the movement of the router in said second direction is limited to a predetermined distance thereby enabling the router bit to cut from the work piece a groove, slot, step or cutaway section of the desired width, and adjustable alignment means on said support plate located about and along said second direction whereby said apparatus may be precisely positioned on the work piece thereby enabling the router to cut a groove, slot, step or other cutaway section in the desired location.

2. The apparatus according to claim 1 wherein said enlarged opening in said support plate is elongated in a direction corresponding to said second direction.

3. The apparatus according to claim 1 wherein said adjustable guide means on said support plate adapted for guiding the movement of the router in a second direction transverse to said first direction, will consist of a stationary stop element and an adjustable stop element whereby the movement of the router bit in said second direction may be precisely controlled to a predetermined distance, and two adjustable guide elements whereby the movement of the router bit in said first direction may be limited to the boundaries of said elongated opening.

4. The apparatus according to claim 1 wherein said adjustable alignment means on said support plate will consist of two oppositely disposed adjustable pointers whereby the operational boundary of the router bit cutting circle as defined by said stationary stop element, may be precisely indicated on the work piece.

5. A precision router guide apparatus adapted to guide a high speed router for cutting grooves, slots, steps and other cutaway sections of variable width from a work piece, said router including a router base and a router bit, said apparatus comprising:

a rectilinear guide member, clamp means adapted for attachment of said guide member to the work piece, an adjustable template assembly adapted to be removably coupled to said guide member thereby enabling sliding motion of said template assembly along said guide member in a first direction over said work piece, said template assembly including a generally flat support plate adapted for receiving the router base thereon and having an enlarged opening therein enabling the router bit to extend therethrough into engagement with the work piece and coupling means along one edge of said support plate whereby the support plate may be removably coupled to said guide member thereby enabling secure sliding motion of said support plate along said guide member in said first direction, and adjustable guide means on said support plate adapted for limiting the movement of the router relative thereto in said first direction while enabling movement of the router relative thereto in a second direction, transverse to said first direction, and adjustable stop means on said support plate adapted for limiting the movement of the router relative thereto in said second direction to a predetermined distance whereby when said template assembly with the energized router thereon is coupled to said guide member and traversed over the work piece in said first and second directions alternately, the router bit will cut from the work piece a groove, slot, step or cutaway section of the desired width, and adjustable alignment means on said support plate located about and along said second direction whereby said apparatus may be precisely positioned on the work piece thereby enabling the router to cut a groove, slot, step or cutaway section in the desired location.

6. The apparatus according to claim 5 wherein said clamp means adapted for attachment of said guide member to the work piece will include an incrementally adjustable reference block configured for attachment at predetermined incremental positions along said guide member, a screw adjustable clamp block configured for limited rectilinear clamping motion along said guide member, and a clamp screw enabling clamping force to be applied to said screw adjustable clamp block, whereby when said reference and said clamp blocks are correctly adjusted, and the work piece positioned therebetween, the clamp screw may be tightened, thereby clamping said guide member to said work piece.

7. The apparatus according to claim 5 wherein said enlarged opening in said support plate is elongated in a direction corresponding to said second direction.

8. The apparatus according to claim 5 wherein said coupling means along one edge of said support plate will include a guide member coupling element configured to provide a precise slidingly compatible engagement between said support plate and said guide member.

9. The apparatus according to claim 5 wherein said adjustable guide means on said support plate adapted for limiting the movement of the router relative thereto in said first direction, will include two adjustable guide elements whereby the movement of the router bit in said first direction may be limited to the boundaries of said elongated opening.

10. The apparatus according to claim 5 wherein said adjustable stop means on said support plate adapted for limiting movement of the router relative thereto in said second direction to a predetermined distance will include a stationary stop element and an adjustable stop element whereby the movement of the router in said second direction may be precisely controlled to a predetermined distance.

11. The apparatus according to claim 5 wherein said adjustable alignment means on said support plate will consist of two oppositely disposed adjustable pointers located on the outer edges of said support plate whereby when the router base is operably disposed between said adjustable guide elements and in contact with said stationary stop element on said support plate, the adjustable pointers will define a line parallel to said first direction, and tangent to the router bit cutting circle at the point nearest said stationary stop, thereby precisely locating the groove, slot, step or other cutaway section on the work piece.

12. A method for guiding a router to cut grooves, slots steps and other cutaway sections of variable widths from a work piece, said router including a base and a router bit, said method comprising:
    locating a reference line on the work piece to identify the boundary of the desired groove, slot, step or cutaway section to be formed,
    positioning a rectilinear guide member with an integral clamping assembly on the work piece in a generally parallel relation to the location of the desired groove, slot, step or other cutaway section to be formed,
    coupling a template assembly to said rectilinear guide member, thereby enabling sliding motion of said template assembly along said guide member in a first direction over said work piece, said template assembly including
        a support plate adapted for receiving the router base thereon and having an enlarged opening therein enabling the router bit to extend therethrough into engagement with the work piece, said support plate having a coupling element along one edge configured for secure sliding engagement with said guide member, in said first direction, and
        adjustable guide means on said support plate adapted for guiding the movement of the router in a second direction transverse to said first direction whereby the movement of the router in said second direction is limited by one fixed and one adjustable stop to a predetermined distance thereby enabling the router bit to cut from the work piece a groove, slot, step or cutaway section of the desired width, and
        adjustable alignment means on said support plate whereby said apparatus may be precisely positioned on the work piece thereby enabling the router to cut a groove, slot, step or cutaway section in the desired location,
    positioning the coupled guide member and the template assembly on the work piece until the alignment means on said template assembly lies directly over said reference line,
    engaging the integral clamp to firmly attach said guide member to the work piece,
    positioning the base of the router on said template assembly with the router bit extending through said enlarged opening into engagement with said work piece to the desired depth,
    adjusting the guide means on said support plate whereby the movement of the router in said second direction will be equal to the width of the desired cut minus the diameter of the router bit,
    energizing the router and moving the template assembly with the router thereon along the guide member in a first direction.

13. The method of claim 12 wherein the template assembly is moved in said first direction with the router base against said fixed stop a distance corresponding to the length of the cutaway section.

14. The method of claim 13 wherein the router is moved in said second direction until the router base is in contact with said adjustable stop after moving the template assembly said distance.

15. The method of claim 14 wherein said template assembly is again moved in said first direction a distance corresponding to the length of the cutaway section after moving said router in said second direction.

16. The method of claim 15 wherein said template assembly is again moved in said first and second directions as necessary to route out interior portions of the groove, slot, step or other cutaway section if required.

* * * * *